US010176387B2

(12) United States Patent
Kawasaki et al.

(10) Patent No.: US 10,176,387 B2
(45) Date of Patent: Jan. 8, 2019

(54) ROAD SHAPE RECOGNITION APPARATUS

(71) Applicant: DENSO CORPORATION, Kariya, Aichi-pref. (JP)

(72) Inventors: Naoki Kawasaki, Nishio (JP); Youhei Masui, Kariya (JP); Toyoharu Katsukura, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 0 days.

(21) Appl. No.: 15/506,614

(22) PCT Filed: Aug. 24, 2015

(86) PCT No.: PCT/JP2015/073679
§ 371 (c)(1),
(2) Date: Feb. 24, 2017

(87) PCT Pub. No.: WO2016/031753
PCT Pub. Date: Mar. 3, 2016

(65) Prior Publication Data
US 2017/0270373 A1    Sep. 21, 2017

(30) Foreign Application Priority Data

Aug. 25, 2014  (JP) ................................ 2014-170392

(51) Int. Cl.
*B62D 6/00*        (2006.01)
*G06K 9/00*        (2006.01)
(Continued)

(52) U.S. Cl.
CPC .......... *G06K 9/00798* (2013.01); *B60R 21/00* (2013.01); *G06T 7/60* (2013.01);
(Continued)

(58) Field of Classification Search
CPC ............... B60T 8/1755; B60T 2201/16; B60T 2210/24; B60T 2210/20; B60T 201/085;
(Continued)

(56) References Cited

U.S. PATENT DOCUMENTS 6,718,259 B1 *  4/2004  Khosla ................... G01C 21/26
                                                    340/435
6,819,779 B1 * 11/2004  Nichani ............. G06K 9/00798
                                                    382/104
(Continued)

FOREIGN PATENT DOCUMENTS

DE  PCT/DE2013/200115  * 12/2014 ............. G01C 21/26
JP       2001-010524 A     1/2001
(Continued)

OTHER PUBLICATIONS

Rollover Risk Prediction of Heavy Vehicle Using High-Order Sliding-Mode Observer: Experimental Results; Hocine Imine; Abdelaziz Benallegue; Tarek Madani; Salim Srairi; IEEE Transactions on Vehicular Technology; Year: 2014, vol. 63, Issue: 6: pp. 2533-2543.*

(Continued)

*Primary Examiner* — Cuong H Nguyen
(74) *Attorney, Agent, or Firm* — Knobbe, Martens, Olson & Bear, LLP

(57) ABSTRACT

A road shape recognition apparatus is mounted in a vehicle. The road shape recognition apparatus acquires a road image, determines a road shape using the road image, recognizes the road shape based on the road image within a predetermined recognition range, and estimates the road shape outside of the recognition range based on the road shape within the recognition range. The road shape recognition apparatus estimates the road shape outside of the recognition range and within a first distance as a curved line of which a curvature change rate is constant, and the road shape farther (Continued)

than the first distance as a curved line of which a curvature is constant.

20 Claims, 6 Drawing Sheets

(51) Int. Cl.
  *B60R 21/00* (2006.01)
  *G06T 7/60* (2017.01)
  *B60W 30/12* (2006.01)
(52) U.S. Cl.
  CPC ..... *B60T 2201/085* (2013.01); *B60T 2210/20* (2013.01); *B60T 2210/24* (2013.01); *B60W 30/12* (2013.01); *B60W 2420/40* (2013.01)
(58) Field of Classification Search
  CPC . B60T 2201/08; G01C 21/26; G01C 21/3697; G08G 1/167; B60W 2250/146; B60W 30/12
  USPC .......................... 701/70, 72, 93, 96; 340/905
  See application file for complete search history.

(56) References Cited

U.S. PATENT DOCUMENTS

| | | | | |
|---|---|---|---|---|
| 6,823,241 B2* | 11/2004 | Shirato | ................ | G06K 9/4609 701/1 |
| 7,764,192 B2* | 7/2010 | Sekine | ................ | B60T 8/1755 340/438 |
| 7,778,758 B2* | 8/2010 | Tsuchiya | ............ | B60K 31/0066 382/104 |
| 8,258,980 B2* | 9/2012 | Becker | ................ | B60W 40/072 340/435 |
| 8,370,042 B2* | 2/2013 | Tokimasa | ............... | B60K 31/00 701/70 |
| 8,577,552 B1* | 11/2013 | Smit | ...................... | G01S 13/931 701/41 |
| 8,606,539 B2* | 12/2013 | Takabayashi | ...... | G06K 9/00798 702/142 |
| 8,655,549 B2* | 2/2014 | Hayakawa | .......... | B60T 8/17557 701/116 |
| 9,536,155 B2* | 1/2017 | Takemae | .................... | B60R 1/00 |
| 2002/0042668 A1* | 4/2002 | Shirato | ............. | G06K 9/00798 701/1 |
| 2009/0048755 A1* | 2/2009 | Tokimasa | ............... | B60K 31/00 701/94 |
| 2010/0030430 A1* | 2/2010 | Hayakawa | .......... | B60T 8/17557 701/42 |
| 2011/0295548 A1* | 12/2011 | Takabayashi | ...... | G06K 9/00798 702/142 |
| 2014/0025227 A1* | 1/2014 | Yoshihama | ......... | B60W 40/072 701/1 |
| 2014/0032072 A1* | 1/2014 | Yoshihama | ............... | B60T 7/18 701/70 |
| 2015/0149036 A1* | 5/2015 | You | ........................ | B60W 30/12 701/41 |
| 2015/0294161 A1* | 10/2015 | Schamp | ................. | B60K 31/00 701/37 |
| 2015/0294571 A1* | 10/2015 | Shida | ..................... | G08G 1/161 701/409 |
| 2017/0270373 A1* | 9/2017 | Kawasaki | .......... | G06K 9/00798 |

FOREIGN PATENT DOCUMENTS

| | | | | |
|---|---|---|---|---|
| JP | 2016043837 A | * | 4/2016 | ............. B60R 21/00 |
| WO | WO-2016031753 A1 | * | 3/2016 | ............. B60R 21/00 |

OTHER PUBLICATIONS

Predict the road to prevent roll-over, using the navigation database; Joop Pauwelussen; Dionysis Linardatos; 2008 IEEE Intelligent Vehicles Symposium; Year: 2008; pp. 944-949.*

Predictive curve anticipation; Frederic Holzmann; Mario Bellino; Armin Sulzmann; 2006 IEEE International Conference on Vehicular Electronics and Safet;Year: 2006.*

Long-term vehicle motion prediction; Christoph Hermes; Christian Wohler; Konrad Schenk; Franz Kummert; 2009 IEEE Intelligent Vehicles Symposium; Year: 2009.*

Improving driver's visual field using estimation of curvature; Ki-Hyeon Kim et al., ICCAS 2010; pp. 728-731; year 2010.*

Shape understanding from Lambertian photometric flow fields; L.B. Wolff; Proceedings CVPR '89: IEEE Computer Society Conference on Computer Vision and Pattern Recognition; pp. 46-52; Year: 1989.*

Piecewise Approximation of Contours Through Scale-Space Selection of Dominant Points; Antonio M. G. Pinheiro ; Mohammed Ghanbari; IEEE Transactions on Image Processing; Year: 2010, vol. 19, Issue: 6; pp. 1442-1450.*

Sparse, variable-representation active contour models; A. Rexhepi ; F. Mokhtarian ; A. Rosenfeld; Proceedings of the 17th International Conference on Pattern Recognition, 2004. ICPR 2004; Year: 2004, vol. 3; pp. 683-686 vol. 3 IEEE Conferences.*

* cited by examiner

FIG.4
(a) 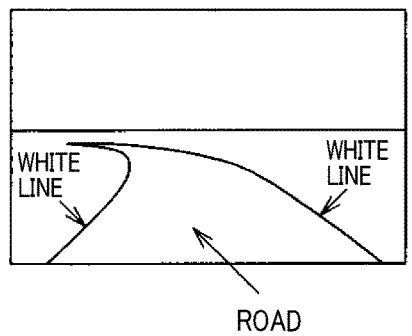
(b) 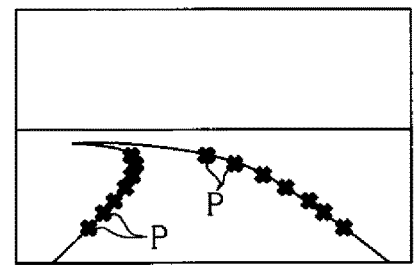
FIG.5
(a) 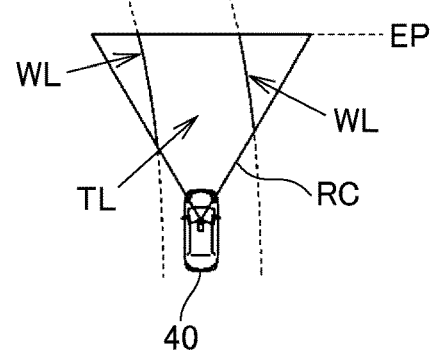
(b) 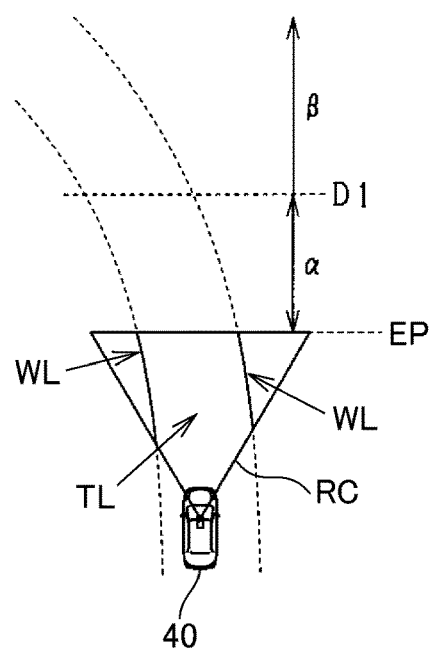

FIG.6
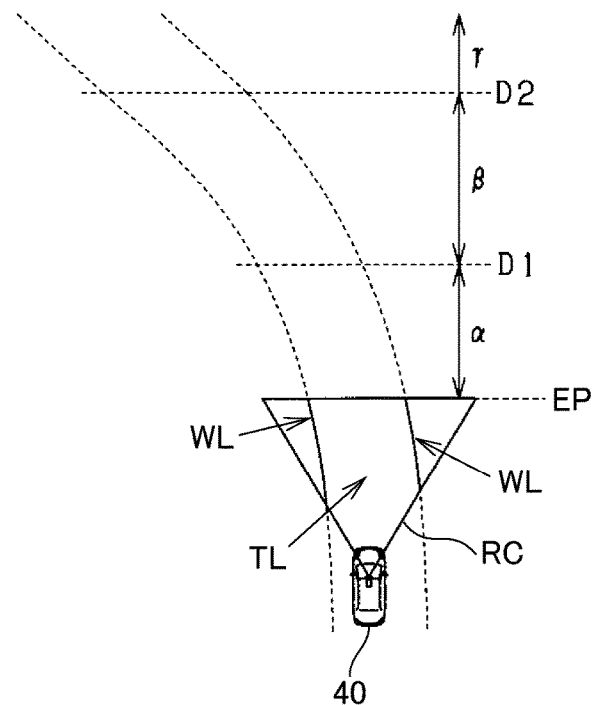
FIG.7
(a)
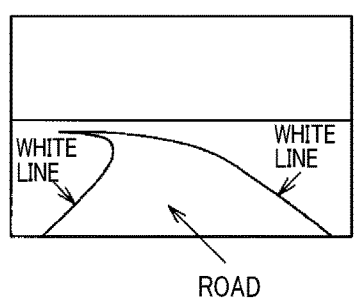
(b) PRECEDING VEHICLE
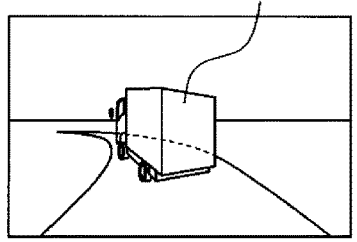
(c) IRRADIATION AREA
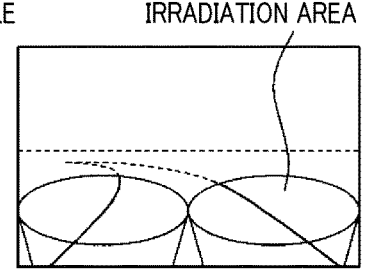

ROAD SHAPE RECOGNITION APPARATUS

CROSS-REFERENCE TO RELATED APPLICATION

This application is a U.S. National Phase Application under 35 U.S.C. 371 of International Application No. PCT/JP2015/073679 filed on Aug. 24, 2015 and published in Japanese as WO 2016/031753 A1 on Mar. 3, 2016. This application is based on and claims the benefit of priority from Japanese Patent Application No. 2014-170392, filed Aug. 25, 2014. The entire disclosures of all of the above applications are incorporated herein by reference.

TECHNICAL FIELD

The present invention relates to a road shape recognition apparatus that recognizes the shape of a road based on a captured road image.

BACKGROUND ART

Conventionally, as an apparatus that recognizes a road shape from travel lane markings and the like based on a captured road image, there is an apparatus described in PTL 1. In the apparatus described in PTL 1, a curvature and a clothoid parameter (a parameter in which a curvature change rate is constant) of a road are calculated from a captured road image. The behavior of a vehicle is predicted through use of the calculated clothoid parameter.

CITATION LIST

Patent Literature

[PTL 1] JP-A-2001-10524

SUMMARY OF INVENTION

Technical Problem

When the road shape is recognized from a captured road image, a road shape outside of a recognition range can be estimated through use of the recognized road shape. However, the accuracy of the clothoid parameter obtained through image recognition is low. When a distant road shape is estimated based on the clothoid parameter, an increase in deviation between an actual road shape and the estimated road shape becomes a problem.

The present invention has been achieved to solve the above-described issue. The main object of the present invention is to provide a road shape recognition apparatus that is capable of accurately estimating a road shape that is farther than a recognition range.

Solution to Problem

The present invention is a road shape recognition apparatus that acquires a road image by a road image acquiring means mounted in a vehicle and determines a road shape using the road image. The road shape recognition apparatus is characterized by including: a recognition processing means for recognizing the road shape based on the road image within a predetermined recognition range; and an estimation processing means for estimating the road shape outside of the recognition range based on the road shape within the recognition range, in which the estimation processing means estimates the road shape outside of the recognition range and within a predetermined first distance as a curved line of which a curvature change rate is constant, and estimates the road shape farther than the first distance as a curved line of which a curvature is constant.

When the estimation of the road shape is performed through use of a curved line of which the curvature change rate is constant and parameter estimation accuracy is low, error increases as the distance from the recognition range becomes farther. In the above-described configuration, the estimation of the road shape based on the curved line of which the curvature change rate is constant and parameter estimation accuracy is low is performed up to the first distance. The estimation of the road shape farther than the first distance is performed based on the curved line of which the curvature is constant. Therefore, deviation between the estimated road shape and an actual road shape can be reduced.

In addition, the shape of a curved section on an actual road transitions to a section in which the curvature is constant by passing through a transition section set based on a clothoid curve of which the curvature change rate is constant. Regarding this point, in the above-described configuration, the curvature change rate is constant up to the first distance, and the curvature is constant beyond the first distance. Therefore, the road shape farther than the recognition range can be estimated as a shape approximate to the actual road shape.

BRIEF DESCRIPTION OF DRAWINGS

In the accompanying drawings:

FIG. 4 illustrates, by (a), a schematic diagram of a road to be imaged and, by (b), a diagram of a white line recognition process;

FIG. 5 illustrates, by (a), a diagram of a white line shape on a road estimated with a curvature change rate being constant and, by (b), a diagram of a white line shape on a road estimated with a curvature farther than a first distance being constant;

FIG. 6 is a diagram of a white line shape estimated with a curvature change rate being constant up to a first distance, a curvature being constant up to a second distance, and the white line shape farther than the second distance being a straight line;

FIG. 7 illustrates, by (a), a schematic diagram of a road imaged at a normal time and, by (b) and (c), show examples in which recognition distance becomes shorter;

DESCRIPTION OF EMBODIMENTS (First Embodiment)

A road shape recognition apparatus according to the present embodiment will hereinafter be described with reference to the drawings. The road shape recognition apparatus according to the present embodiment is mounted in a vehicle. A road shape including a road width and a curvature of a road that is recognized by the road shape recognition apparatus is used, for example, in lane keeping assist. In lane keeping assist, control is performed to prevent the vehicle from deviating from a travel lane marking, such as a white line. The road shape recognition apparatus according to the present embodiment recognizes the road shape from the shape of the white line (white line shape) on the road.

Figure 1:
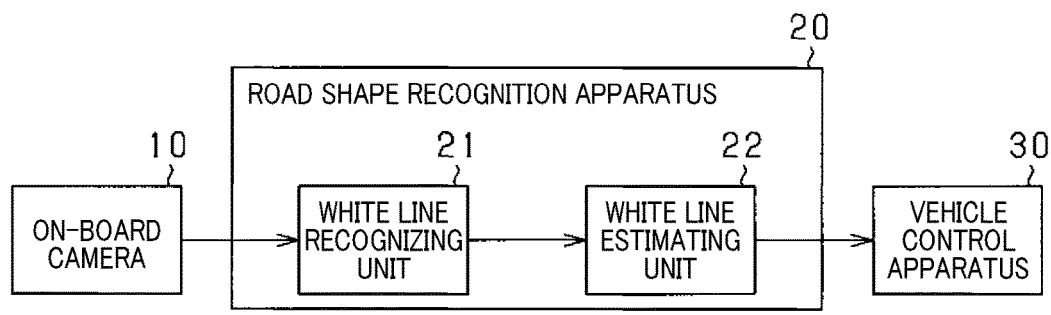
FIG. 1 is a diagram of a configuration of a road shape recognition apparatus according to an embodiment.

First, a configuration of a road shape recognition apparatus 20 according to the present embodiment will be described with reference to FIG. 1. The road shape recognition apparatus 20 according to the present embodiment includes a white line recognizing unit 21 (recognition processing means) and a white line estimating unit 22 (estimation processing means). The road shape recognition apparatus 20 is configured to transmit, to a vehicle control apparatus 30, a white line shape acquired by processing an image inputted from an on-board camera 10 (road image acquiring means).

Figure 2:
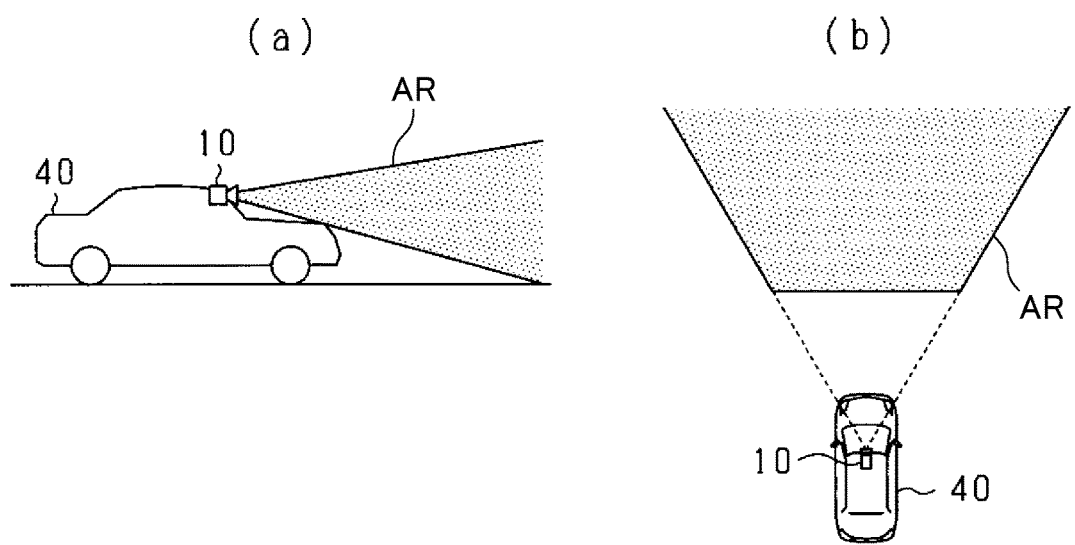
FIG. 2 is a diagram of a range imaged by an on-board camera.

The on-board camera 10 is a charge-coupled device (CCD) camera, a complementary metal-oxide-semiconductor (CMOS) image sensor, a near-infrared camera, or the like. As shown in FIG. 2(a) and FIG. 2(b), the on-board camera 10 is mounted in a vehicle 40 so as to image a traveling path (road) ahead of the vehicle 40. Specifically, the on-board camera 10 is attached at the center in a vehicle-width direction of the vehicle 40, so as to a rearview minor. The on-board camera 10 images an area (shaded areas in FIG. 2(a) and FIG. 2(b)) AR that widens at a predetermined angular range towards the direction ahead of the vehicle.

The road shape recognition apparatus 20 is configured as a computer that includes a central processing unit (CPU), a memory, and the like. Functions of the white line recognizing unit 21 and the white line estimating unit 22 are actualized by the CPU running a program stored in the memory.

The white line shape on the road recognized by the white line recognizing unit 21 and a distant white line shape on the road estimated by the white line estimating unit 22 are inputted to the vehicle control apparatus 30. The vehicle control apparatus 30 performs control based on vehicle speed, yaw rate, and the like inputted from various sensors (not shown), and the white line shape and the distant white line shape on the road. That is, the vehicle control apparatus 30 predicts a future position of the vehicle 40 from the vehicle speed and the yaw rate. The vehicle control apparatus 30 then determines whether or not there is risk of the vehicle 40 deviating from the white line on the road using the predicted future position of the vehicle 40, and the white line shape and the distant white line shape on the road. Then, for example, should the vehicle control apparatus 30 have a warning function, the vehicle control apparatus 30 performs a warning display on a display provided in the vehicle 40 or generates a warning sound from a speaker provided in the vehicle 40, when determined that there is risk of the vehicle 40 deviating from the white line on the road. In addition, should the vehicle control apparatus 30 have a driving assistance function, the vehicle control apparatus 30 applies steering force to a steering wheel when determined that there is risk of the vehicle 40 deviating from the white line on the road.

Figure 3:
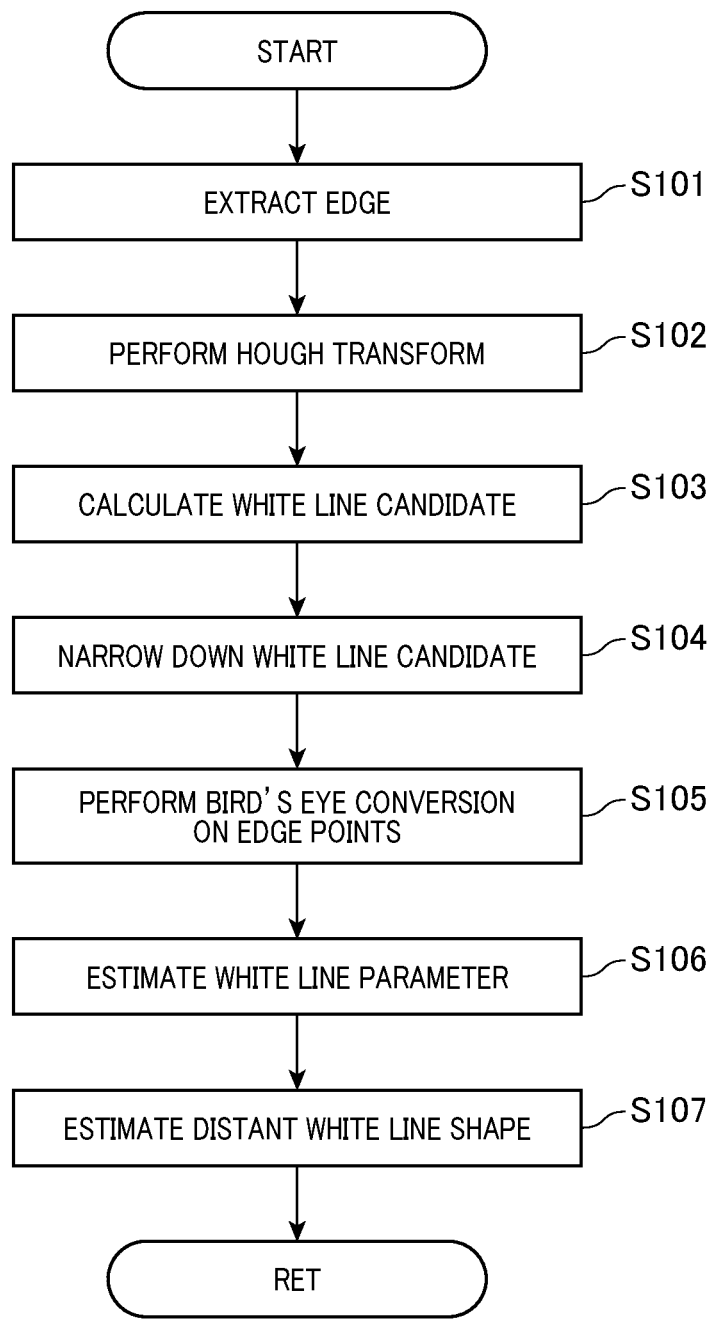
FIG. 3 is a flowchart of processes performed by the road shape recognition apparatus.

FIG. 3 is a flowchart of a series of processes performed by the white line recognizing unit 21 and the white line estimating unit 22 of the road shape recognition apparatus 20. The processes are repeatedly performed at a predetermined control cycle. In addition, FIG. 4 shows, by (a), an example of a captured road image. FIG. 4 shows, by (b), the process by which the white line on the road is detected based on the flowchart in FIG. 3.

First, the white line recognizing unit 21 extracts an edge point P based on luminance information of the road image (step S101). The white line recognizing unit 21 then performs a Hough transform on the extracted edge point P (step S102). Next, at step S102, the white line recognizing unit 21 performs extraction of a straight line or a curved line on which a plurality of edge points P are continuously aligned. When the extraction of a straight line or a curved line is performed, the white line recognizing unit 21 calculates a feature quantity with the straight line or the curved line as a white line candidate on the road (step S103). The white line recognizing unit 21 uses the feature quantities to narrow down, from the white line candidates, a pair of straight lines or curved lines that extend in the advancing direction of the vehicle 40 as the white line candidate on the road (step S104).

Next, the white line recognizing unit 21 performs a bird's eye conversion on the edge points P (step S105). As shown in FIG. 4 by (a) and (b), the road is imaged from a bird's eye view. Therefore, the extracted white line on the road is also acquired as a bird's eye view. Here, the white line recognizing unit 21 performs a coordinate transform on the edge points P of the acquired white line candidate on the road using the attachment position and attachment angle of the on-board camera 10, and performs a conversion to a plan view. At this time, in the plan view, of the range imaged by the on-board camera 10, a range over which the white line on the road can be recognized is defined as a recognition range. That is, the position of the recognizable white line on the road that is the farthest from the vehicle 40 is an end portion of the recognition range.

Then, to estimate a parameter specifying the white line shape on the road that has been converted to a plan view, the white line estimating unit 22 performs an approximation of the shape by a polynomial (step S106). Then, the white line estimating unit 22 estimates the distant white line shape on the road outside of the recognition range by extending the polynomial used for approximation to outside of the recognition range (step S107).

Next, the white line parameter estimation process (step S106) and the distant white line shape estimation process (step S107) in the flowchart in FIG. 3 will be described in detail. The processes are processes performed by the white line estimating unit 22.

First, the white line estimating unit 22 calculates the parameter of the white line on the road recognized by the white line recognizing unit 21. To calculate the parameter of the white line, the fact that a curved section of a road is designed as a clothoid curve to which a clothoid parameter is applied, is used. That is, the curved section of a road transitions to a straight section by passing through, in sequence, a transition section defined by a clothoid curve of which the rate of increase in curvature is constant, a section in which the curvature is constant, and a transition section defined by a clothoid curve of which the rate of decrease in curvature is constant.

It is known that the clothoid curve of which the curvature change rate is constant can be approximated by a cubic curve. Therefore, the parameter of the white line on the road within the recognition range is approximated through use of a following expression (1) indicating the cubic curve. In expression (1), x denotes a coordinate in the advancing direction of the vehicle 40, f(x) denotes a coordinate in a direction perpendicularly intersecting the advancing direction of the vehicle 40, and a, b, c, and d are each a constant.
[Formula 1]

$$f(x)=ax^3+bx^3+cx+d \qquad (1)$$

Then, the white line on the road up to a first distance D1 is estimated through use of the above-described expression (1). The first distance D1 is a distance away from the end portion of the recognition range by a predetermined distance. That is, under a presumption that the white line shape on the road outside of the recognition range changes based on the above-described expression (1) up to the first distance D1, the shape of the white line outside of the recognition range is considered to be a curved line based on the above-described expression (1). The first distance D1 is defined as a distance at which the deviation from the actual shape is confirmed to be small, when the white line shape on the road is approximated by a cubic curve. The first distance D1 is stored in the memory of the road shape recognition apparatus 20.

Next, the white line shape on the road farther than the first distance D1 is estimated. At this time, when the x coordinate at the first distance D1 is x1, C, which denotes the curvature at the first distance D1 of the white line estimated by the above-described expression (1), is expressed by a following expression (2).

[Formula 2]

$$C = \frac{f''(x1)}{(1+f'(x1)^2)^{\frac{3}{2}}} \qquad (2)$$

Then, the white line shape on the road farther than the first distance D1 is estimated as a curved line having a constant curvature based on C that has been determined as the curvature in the above-described expression (2).

FIG. 5 shows, by (a), an example in which the white line shape on the road outside of the recognition range is estimated as a curved line of which the curvature increases at a constant curvature change rate. Meanwhile, FIG. 5 shows, by (b), the white line shape on the road determined by the processes according to the present embodiment in which a section from an end portion EP of a recognition range RC to the first distance D1 is a first section α in which the white line shape is estimated as a curved line of which the curvature increases at a constant curvature change rate, and a section farther than the first distance D1 is a second section β in which the white line shape is estimated as a curved line of which the curvature is constant.

As shown in FIG. 5 by (a) and (b), the interior of a triangle of which the vehicle 40 is a vertex is the recognition range RC. A white line WL on a road TL within the recognition range RC, that is, the white line WL on the road TL recognized by the white line recognizing unit 21 is indicated by a solid line. The white line WL on the road outside of the recognition range RC, that is, the white line WL on the road TL estimated by the white line estimating unit 22 is indicated by a broken line. As shown in FIG. 5 by (a), the curvature becomes excessively large in the far distance, because the curvature change rate is constant throughout the outside of the recognition range RC. Meanwhile, as shown in FIG. 5 by (b), the curved line is such that the curvature increases in the first section α and the curvature is constant in the second section β. Therefore, the risk of the curvature becoming excessively large in the far distance decreases.

As a result of the above-described configuration, the road shape recognition apparatus 20 according to the present embodiment achieves the following effects.

When the estimation of the white line shape is performed through use of a curved line of which the curvature change rate is constant and parameter estimation accuracy is low, error increases as the distance from the recognition range RC becomes farther. According to the present embodiment, the estimation of the white line shape based on the curved line of which the curvature change rate is constant and parameter estimation accuracy is low is performed from the end portion EP of the recognition range RC to the first distance D1. The estimation of the white line shape farther than the first distance D1 is performed based on a curved line of which the curvature is constant. Therefore, the deviation between the estimated white line shape on the road TL and the actual white line shape on the road TL can be reduced.

The curvature at the first distance D1 of the white line in the first section α is used as the curvature in the second section β. Therefore, the curved line of the first section α and the curved line of the second section β can be a curved line that continuously changes.

The shape of a curved section on an actual road transitions to a section in which the curvature is constant by passing through a transition section set based on the clothoid curve of which the curvature change rate is constant. Regarding this point, according to the present embodiment, the estimation is performed with a section from the end portion EP of the recognition range RC to the first distance D1 as the first section α in which the curvature change rate is constant, and the section farther than the first distance D1 as the second section β in which the curvature is constant. Therefore, according to the present embodiment, the white line shape on the road TL farther than the recognition range RC can be estimated as a shape approximate to the actual white line shape on the road TL.

(Second Embodiment)

According to the present embodiment, the overall configuration is the same as that according to the first embodiment. The process performed by the white line estimating unit 22 differs. According to the present embodiment, a second distance D2 is also stored in the memory of the road shape recognition apparatus 20, in addition to the first distance D1. The second distance D2 is a value that is greater than the first distance D1.

According to the present embodiment, regarding the white line shape outside of the recognition range RC, a section up to the first distance D1 is a curved line of which the curvature change rate is constant. A section farther than the first distance D1 and up to the second distance D2 is a curved line of which the curvature is constant. A section farther than the second distance D2 is a straight line.

FIG. 6 shows the white line shape outside of the recognition range RC estimated by the white line estimating unit 22. In a manner similar to that according to the first embodiment, the section outside of the recognition range RC and up to the first distance D1 is the first section α in which the white line shape on the road TL is estimated as a curved line of which the curvature change rate is constant. In a manner similar to that according to the first embodiment, the section from the first distance D1 to the second distance D2 is the second section β in which the white line shape on the road TL is estimated as a curved line of which the curvature is constant and the curvature in the section up to the first distance D1 is used. Furthermore, the section farther than the second distance D2 is a third section γ in which the white line shape on the road TL is estimated as a straight line that is an extension line of a tangent at the second distance D2 of the curved line of which the curvature is constant in the second section β.

According to the present embodiment, the following effects are achieved in addition to the effects achieved according to the first embodiment, as a result of the above-described configuration.

Even in the case in which the white line shape on the road TL farther than the first distance D1 is estimated as a curved line of which the curvature is constant to suppress deviation from the actual white line shape on the road TL in the section farther than the first distance D1, a width of the deviation increases as the distance from the recognition range RC becomes farther. Therefore, according to the present embodiment, the second distance D2 is provided in addition to the first distance D1. The white line shape on the road TL is estimated as a straight line in the section farther than the second distance D2. Therefore, deviation between the actual white line shape on the road TL and the estimated white line shape can be suppressed.

According to the present embodiment, the white line shape on the road TL farther than the second distance D2 is estimated as a straight line. Therefore, processing load placed on the road shape recognition apparatus 20 for calculation of the white line shape on the road TL farther than the second distance D2 can be suppressed.

Third Embodiment

In the road shape recognition apparatus 20 according to the present embodiment, the overall configuration is the same as that according to the second embodiment. The process performed by the white line estimating unit 22 partially differs.

According to the present embodiment, a recognition distance Drec is determined based on the white line shape on the road TL recognized by the white line recognizing unit 21. The recognition distance Drec is determined as a length of the white line WL on the road TL within the recognition range RC.

Circumstances under which the recognition distance Drec changes will be described with reference to FIGS. 7 and 8. FIG. 7 shows, by (a), the road TL that is imaged when a preceding vehicle is not present and a certain amount of illumination is present. FIG. 7 shows, by (b), the road TL that is imaged when a preceding vehicle is present and a portion of the white line WL is hidden by the preceding vehicle. FIG. 7 shows, by (c), a case in which it is nighttime, and although the road TL is irradiated by the headlights of the vehicle 40, the area of the road TL that is imaged is limited to that within an irradiation area the road TL.

Figure 8:
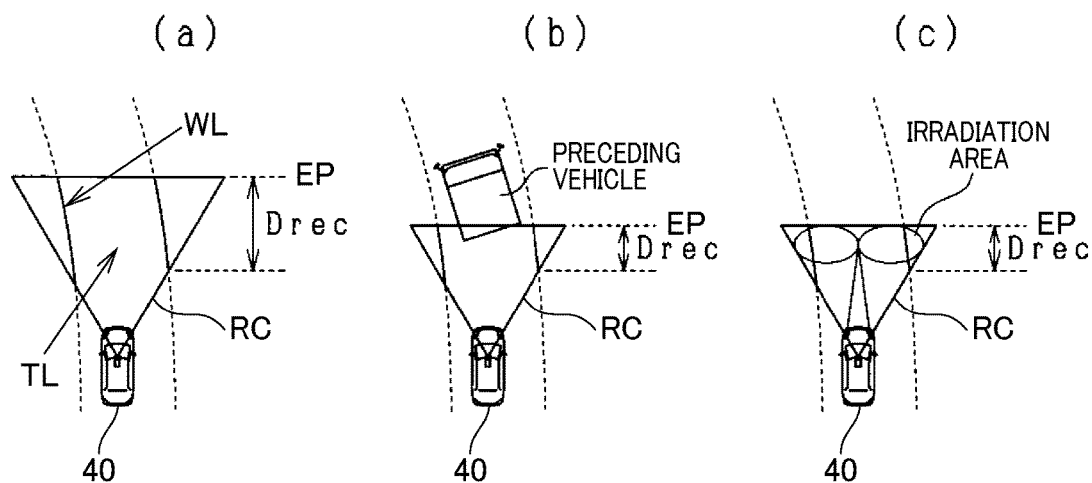
FIG. 8 illustrates, by (a) to (c), the recognition distances in the cases shown in FIG. 7 by (a) to (c)

FIG. 8 show, by (a) to (c), the respective recognition distances in the cases shown in FIG. 7 by (a) to (c). As shown in FIG. 7 by (b), a portion of the white line is hidden by the preceding vehicle. As shown in FIG. 7 by (c), only the white line WL on the road TL within the irradiation area is recognizable. Therefore, the recognition distances Drec shown in FIG. 8 by (b) and (c) are shorter compared to the recognition distance Drec shown in FIG. 8 by (a). That is, the length of the white line WL on the road TL recognized from a captured image changes based on various conditions.

As described according to the above-described first embodiment, approximation by a cubic curve is performed on the white line WL on the road TL within the recognition range RC. The white line WL on the road TL from the end portion EP of the recognition range RC to the first distance D1 is estimated through use of the cubic curve. At this time, error in the approximation of the white line shape on the road TL by a cubic curve becomes greater as the recognition distance Drec becomes shorter. Meanwhile, when an error occurs in the approximation, deviation from the actual white line WL on the road TL resulting from the effects of the error increases as the first distance D1 becomes farther. The curvature at the first distance D1 is used for the curved line farther than the first distance D1 and of which the curvature is constant. Therefore, the deviation also similarly increases. Therefore, according to the present embodiment, the first distance D1 and the second distance D2 are variably set through use of the recognition distance Drec.

Figure 9:
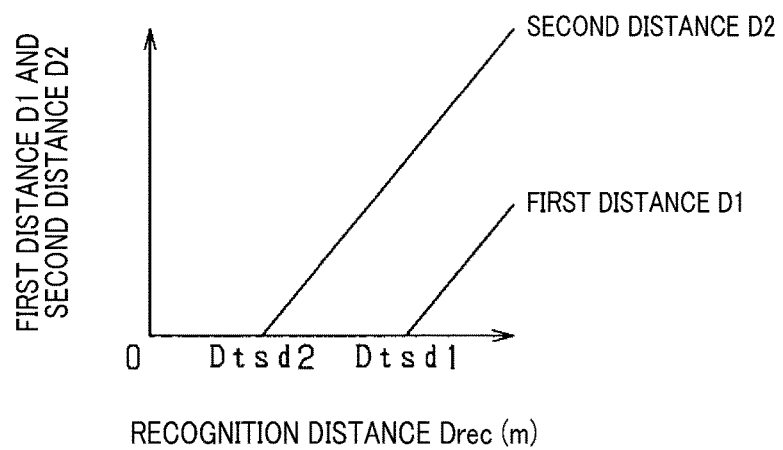
FIG. 9 shows a relationship between the recognition distance, and the first distance and the second distance according to a third embodiment.

FIG. 9 shows a relationship between the recognition distance Drec, and the first distance D1 and the second distance D2. Here, a point that is away from the vehicle 40 by the recognition distance Drec is defined as a zero point for the first distance D1 and the second distance D2. That is, when at least one of the first distance D1 and the second distance D2 are zero, at least one of the first distance D1 and the second distance D2 are set to positions away from the vehicle 40 by only the recognition distance Drec. The first distance D1 is a function that is zero at a first threshold Dtsd1 (>0) of the recognition distance Drec and increases in proportion to the recognition distance Drec. In addition, the second distance D2 is a function that is zero at a second threshold Dtsd2 (>0) that is a value less than the first threshold Dtsd1 and increases in proportion to the recognition distance Drec. That is, the range over which approximation is performed by the curved line of which the curvature change rate is constant increases as the recognition distance Drec increases.

The zero points of the first distance D1 and the second distance D2 are defined as the points away from the vehicle 40 by the recognition distance Drec. However, the position of the vehicle 40 may be the zero points of the first distance D1 and the second distance D2. In this case, when the recognition distance Drec is equal to or less than the first threshold Dtsd1, the first distance D1 is merely required to be set to a value equivalent to the recognition distance Drec. When the recognition distance Drec is equal to or less than the second threshold Dtsd2, the first distance D1 and the second distance D2 are merely required to be set to a value equivalent to the recognition distance Drec. In addition, when the recognition distance Drec is equal to or less than the first threshold Dtsd1, the first distance D1 may not be set. When the recognition distance Drec is equal to or less than the second threshold Dtsd2, the first distance D1 and the second distance D2 may not be set.

When the recognition distance Drec is greater than the first threshold Dtsd1, the section farther than the recognition range RC and up to the first distance D1 is the first section α in which the estimation is made that the curvature change rate is constant. The section from the first distance D1 up to the second distance D2 is the second section β in which the estimation is made that the curvature is constant. In addition, the section farther than the second distance D2 is the third section γ that is estimated to be a straight line.

Meanwhile, when the recognition distance Drec is less than the first threshold Dtsd1 and greater than the second threshold Dtsd2, the first distance D1 is not used. The section farther than the recognition range RC and up to the second distance D2 is the second section β in which the estimation is made that the curvature is constant. The section farther than the second distance D2 is the third section γ that is estimated to be a straight line. At this time, the curved line of which the curvature is constant that is used to estimate the white line shape in the second section β is determined, for example, by the white line WL on the road TL within the recognition range RC being approximated by a quadratic curve or by the curvature within the recognition range RC being calculated.

In addition, the case in which the recognition distance Drec is less than the second threshold Dtsd2 is a case in which the recognized white line WL is short and approximation as a curved line is difficult. Therefore, when the recognition distance Drec is less than the second threshold Dtsd2, the section farther than the recognition range RC is the third section γ that is estimated as a straight line.

Figure 10:
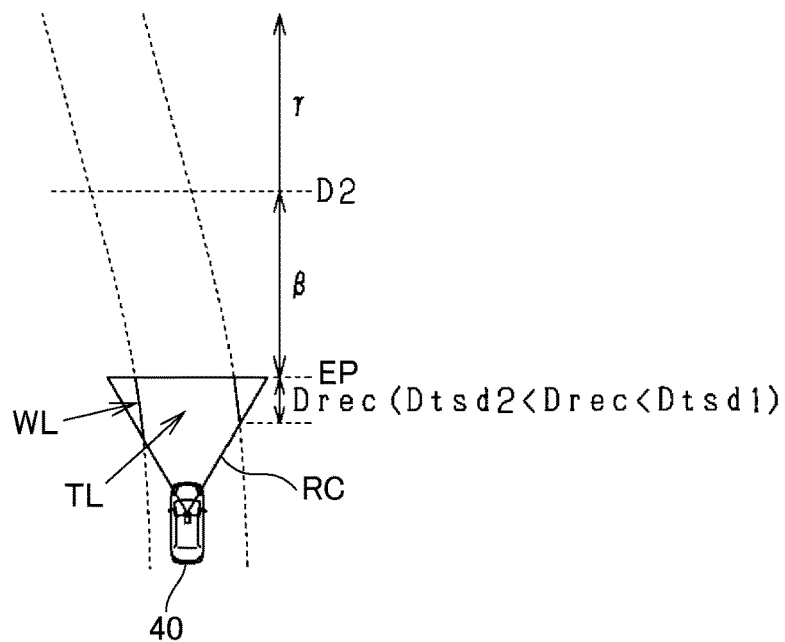
FIG. 10 is a diagram of a white line shape estimated when the recognition distance is shorter than the first distance and longer than the second distance according to the third embodiment.

FIG. 10 shows the white line shape on the road TL that is estimated when the recognition distance Drec is less than the first threshold Dtsd1 and greater than the second threshold Dtsd2. In this case, the first section α in which the curvature change rate is constant is not provided. The section outside of the recognition range RC and up to the second distance D2 is the second section β in which the curvature is constant. The section farther than the second distance D2 is the third section γ in which the white line is considered to be a straight line.

According to the present embodiment, the second embodiment in which the first distance D1 and the second distance D2 are used is modified, and the first distance D1 and the second distance D2 are changed based on the recognition distance Drec. However, this can similarly be applied to cases in which the second distance D2 is not used, the section up to the first distance D1 is the first section α in which the curvature change rate is constant, and the section farther than the first distance D1 is the second section β in which the curvature is constant, as according to the first embodiment.

As a result of the above-described configuration, the road shape recognition apparatus 20 according to the present embodiment achieves the following effects.

The error in the approximation of the white line shape on the road TL by a cubic curve increases as the recognition range RC becomes smaller. The error is such that the deviation from the actual white line shape on the road TL increases as the distance becomes farther, when the white line shape on the road TL outside of the recognition range RC is estimated.

According to the present embodiment, the length of the white line WL on the road TL within the recognition range RC is determined as the recognition distance Drec. The first distance D1 is set to be shorter as the recognition distance Drec becomes shorter. The first distance D1 is set to be longer as the recognition distance Drec becomes longer. Therefore, when the recognition distance Drec is long and the error in the approximation of the white line shape on the road TL by a cubic curve is small, estimation as the curved line of which the curvature change rate is constant can be performed to a farther distance. Meanwhile, when the recognition distance Drec is short and the error in the approximation of the white line shape on the road TL by the cubic curve is large, the section in which estimation is performed as the curved line of which the curvature change rate is constant can be shortened.

(Variation Examples)

According to the above-described third embodiment, the first distance D1 and the second distance D2 are changed based on the recognition distance Drec. However, at least one of the first distance D1 and the second distance D2 may be changed through use of a feature other than the recognition distance Drec. The clothoid parameter is often used for curved sections on highways, expressways, arterial roads, and the like.

Therefore, even when the first distance D1 is set to be far and the white line shape on the road TL outside of the recognition range RC is estimated by a cubic curve approximate to the white line shape on the road TL within the recognition range RC, the deviation from the actual white line shape on the road TL is small. Meanwhile, the clothoid parameter is not used for curved sections in many cases in urban areas and mountainous areas. Therefore, when the curvature of the road TL is diversely varied and the white line shape on the road TL outside of the recognition range RC is estimated through use of the white line shape on the road TL within the recognition range RC, the deviation increases.

Therefore, the type of road may be determined through use of conditions (first condition) indicated in (a) to (d) below, and at least one of the first distance and the second distance may be changed. Here, (a) to (d), below, may be simultaneously used with each other, and may be simultaneously used with the above-described third embodiment.

(a) The road shape recognition apparatus 20 acquires the vehicle speed from a sensor provided in the vehicle 40 and changes at least one of the first distance D1 and the second distance D2 based on the vehicle speed. In this case, for example, the vehicle 40 acquires an average vehicle speed. When the vehicle speed is high, the likelihood of the vehicle 40 traveling on a highway, an expressway, an arterial road, or the like is high. When the vehicle speed is low, the likelihood of the vehicle 40 traveling in an urban area or a mountainous area is high. Therefore, at least one of the first distance D1 and the second distance D2 are changed so as to be proportional to the vehicle speed.

(b) The white line recognizing unit 21 of the road shape recognition apparatus 20 calculates the distance between white lines WL (width of the road TL) based on a recognized pair of white line shapes on the road TL. Then, at least one of the first distance D1 and the second distance D2 are changed based on the calculated distance between the white lines WL. In general, the road width is wide on highways, expressways, arterial roads, and the like. The road width is narrow in urban areas and mountainous areas. Therefore, at least one of the first distance D1 and the second distance D2 are changed so as to be proportional to the road width.

(c) The road shape recognition apparatus 20 acquires map information and a current position of the vehicle 40, and changes at least one of the first distance D1 and the second distance D2 based on the acquired map information and position of the vehicle 40. For example, when the vehicle 40 is traveling on a highway, an expressway, an arterial road, or the like, at least one of the first distance D1 and the second distance D2 may be set to be large. When the vehicle 40 is traveling through an urban area or a mountainous area, at least one of the first distance D1 and the second distance D2 may be set to be small or to zero.

The map information may be acquired from a navigation apparatus or the like provided in the vehicle, and used. However, the map information is not limited thereto. For example, the road shape recognition apparatus 20 may store the map information in the memory. The road shape recognition apparatus 20 may share a memory with the navigation apparatus and read out the map information from the shared memory. In this case, the road shape recognition apparatus 20 also functions as a map information acquiring means and a vehicle position acquiring means.

(d) The road shape recognition apparatus 20 acquires a past travel history of the vehicle 40 and the current position of the vehicle 40, and changes at least one of the first distance D1 and the second distance D2 based on the acquired travel history and the current position of the vehicle 40. At this time, the travel history is classified into history in which the vehicle 40 is determined to be traveling on a highway, an expressway, an arterial road, or the like, history in which the vehicle 40 is determined to be traveling in an urban area, a mountainous area, or the like, and the like. When the current position of the vehicle 40 indicates that the vehicle 40 is traveling on a highway, an expressway, an arterial road, or the like, at least one of the first distance D1 and the second distance D2 may be set to be large. When the vehicle 40 is traveling through an urban area or a mountainous area, at least one of the first distance D1 and the second distance D2 may be set to be small or to zero. In this case, the road shape recognition apparatus 20 also functions as a travel history acquiring means and a vehicle position acquiring means.

According to each of the above-described embodiments, an upper limit may be applied to the distance over which the estimation is made. The estimation may not be performed for the white line WL on the road TL that is farther than the upper limit.

Figure 11:
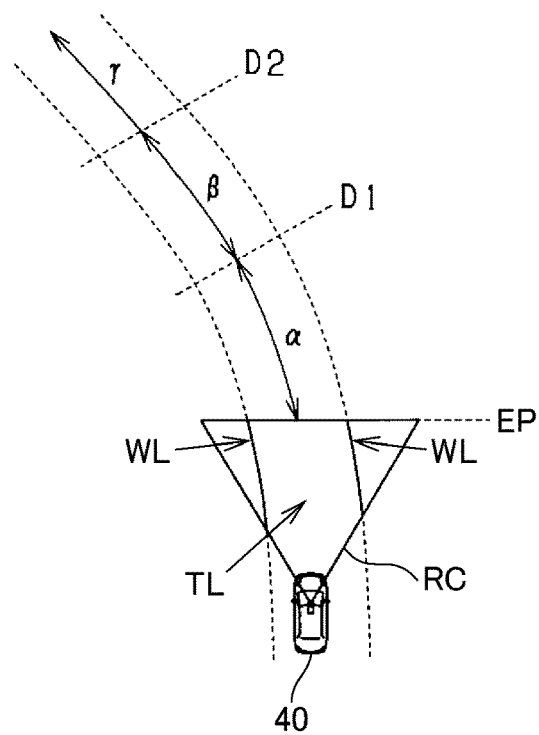
FIG. 11 is a diagram of a variation example of a setting method for the first distance and the second distance.

According to each of the above-described embodiments, at least one of the first distance D1 and the second distance D2 are prescribed in the advancing direction of the vehicle 40. However, at least one of the first distance D1 and the second distance D2 may be prescribed in the direction in which the road TL extends, as shown in FIG. 11.

According to each of the above-described embodiments, the road shape is determined through recognition of the white line WL. However, the road shape may be determined through recognition of a travel lane marking other than the white line WL. In addition, the road shape may be determined through recognition of a structure on the road that is provided along the road, such as a guardrail or a median strip.

According to each of the above-described embodiments, the road image is acquired by the on-board camera 10. However, the road image may be acquired through use of a laser sensor or the like.

According to the above-described third embodiment, when the first distance D1 and the second distance D2 determined based on the recognition distance Drec, the constants of proportionality are the same. However, the constants of proportionality may differ.

According to the above-described third embodiment, the first distance D1 and the second distance D2 are proportional to the recognition distance Drec. However, the first distance D1 and the second distance D2 may be changed in stages. In each of the above-described variation examples as well, the first distance D1 and the second distance D2 may be changed in stages.

According to each of the above-described embodiments, a case in which the curvature of the curve increases is given. However, the estimation can be similarly carried out even in cases in which the curvature decreases, such as at an exit of a curve. That is, the curvature decreases at a constant change rate and gradually becomes closer to a straight line. In this case, when the curvature becomes zero before the first distance D1, the white line shape farther than this point is estimated as a straight line.

Numerous S-shaped curves are provided on roads in mountainous areas. Therefore, on a road in a mountainous area, the curved line may be that of which the curvature change rate is constant until the curvature reaches zero. Furthermore, even after the curvature reaches zero, the curved line may be that of which the curvature change rate is constant, up to the first distance Dl. Regarding this process as well, whether or not the vehicle 40 is traveling in a mountainous area can be determined through use of conditions (second conditions) based on the variation examples in (a) to (d), described above. For example, when the variation example in (a), described above, is used and the speed of the vehicle 40 is lower than a predetermined value, the vehicle 40 may be determined to be traveling in a mountainous area.

REFERENCE SIGNS LIST

10: on-board camera
20: road shape recognition apparatus
21: white line recognizing unit
22: white line estimating unit
40: vehicle
D1: first distance
D2: second distance
Drec: recognition distance

The invention claimed is:

1. A road shape recognition apparatus that acquires a road image by a road image acquiring means mounted in a vehicle and determines a road shape using the road image, the road shape recognition apparatus comprising:
   a recognition processing means for recognizing the road shape based on the road image within a predetermined recognition range; and
   an estimation processing means for estimating the road shape outside of the recognition range based on the road shape within the recognition range,
   the estimation processing means estimating the road shape outside of the recognition range and within a predetermined first distance as a curved line of which a curvature change rate, which is a rate of change of a reciprocal of a radius of curvature, is constant, and estimating the road shape farther than the first distance as a curved line of which a curvature, which is a reciprocal of a radius of curvature, is constant.

2. The road shape recognition apparatus according to claim 1, wherein:
   the road shape farther than the first distance is estimated through use of the curvature of the curved line at the first distance.

3. The road shape recognition apparatus according to claim 2, wherein:
   the first distance is variably changed based on a predetermined first condition.

4. The road shape recognition apparatus according to claim 3, wherein:
   the road shape farther than a predetermined second distance that is farther than the first distance is estimated as a straight line.

5. The road shape recognition apparatus according to claim 4, wherein:
   the road shape farther than the second distance is estimated as a straight line that is a tangent of the curved line at the second distance.

6. The road shape recognition apparatus according to claim 5, wherein:
   the second distance is variably set based on a predetermined first condition.

7. The road shape recognition apparatus according to claim 6, wherein:

the first condition is a recognition distance indicating a length of the road within the recognition range.

8. The road shape recognition apparatus according to claim 7, wherein:
the estimation processing means further includes a means for estimating the road shape outside of the recognition range and within the first distance as a curved line of which the curvature change rate is constant when the recognition distance is greater than a predetermined value, and estimating the road shape outside of the recognition range as a curved line of which the curvature is constant when the recognition distance is less than the predetermined value.

9. The road shape recognition apparatus according to claim 8, wherein:
the first condition is a type of road on which the vehicle is traveling.

10. The road shape recognition apparatus according to claim 9, wherein:
the type of road is determined based on a speed of the vehicle.

11. The road shape recognition apparatus according to claim 10, wherein:
the type of road is determined based on a width of the road recognized by the recognition processing means.

12. The road shape recognition apparatus according to claim 11, further comprising:
a vehicle position acquiring means for acquiring a position of the vehicle, wherein the type of road is determined based on the position.

13. The road shape recognition apparatus according to claim 12, wherein:
the estimation processing means estimates the road shape as a curved line of which the curvature change rate is constant until the curvature reaches zero, when the curvature change rate is a negative value, and estimates the road shape father than a point at which the curvature is estimated to be zero as a straight line.

14. The road shape recognition apparatus according to claim 13, wherein:
the estimation processing means includes a means for estimating the road shape as a curved line of which the curvature change rate is constant, even after the curvature reaches zero, based on a predetermined second condition.

15. The road shape recognition apparatus according to claim 14, wherein:
the second condition is a speed of the vehicle.

16. A road shape recognition method in which a road image is acquired by a road image acquiring means mounted in a vehicle and a road shape is determined through use of the road image, the road shape recognition method comprising:
recognizing, by a recognition processing means mounted in the vehicle, the road shape based on the road image within a predetermined recognition range;
estimating, by an estimation processing means mounted in the vehicle, the road shape outside of the recognition range based on the road shape within the recognition range;
estimating, by the estimation processing means, the road shape outside of the recognition range and within a predetermined first distance as a curved line of which a curvature change rate, which is a rate of change of a reciprocal of a radius of curvature, is constant, and estimating the road shape farther than the first distance as a curved line of which a curvature, which is a reciprocal of a radius of curvature, is constant.

17. The road shape recognition apparatus according to claim 1, wherein:
the first distance is variably changed based on a predetermined first condition.

18. The road shape recognition apparatus according to claim 1, wherein:
the road shape farther than a predetermined second distance that is farther than the first distance is estimated as a straight line.

19. The road shape recognition apparatus according to claim 4, wherein:
the second distance is variably set based on a predetermined first condition.

20. The road shape recognition apparatus according to claim 3, wherein:
the first condition is a recognition distance indicating a length of the road within the recognition range.

* * * * *